United States Patent
Liu et al.

(10) Patent No.: US 7,310,091 B2
(45) Date of Patent: Dec. 18, 2007

(54) HANDWRITING PEN CAPABLE OF SIMULATING DIFFERENT STROKES

(75) Inventors: Chen-Duo Liu, Taipei Hsien (TW); Liang-Wei Ho, Taipei Hsien (TW)

(73) Assignee: Acer Incorporated, Taipei Tsien (TW)

( * ) Notice: Subject to any disclaimer, the term of this patent is extended or adjusted under 35 U.S.C. 154(b) by 675 days.

(21) Appl. No.: 10/823,748

(22) Filed: Apr. 14, 2004

(65) Prior Publication Data

US 2005/0057535 A1 Mar. 17, 2005

(30) Foreign Application Priority Data

Sep. 16, 2003 (TW) ............... 92125435 A
Sep. 16, 2003 (TW) ............... 92125437 A

(51) Int. Cl.
*G06F 3/033* (2006.01)
(52) U.S. Cl. ...................... 345/179; 345/157
(58) Field of Classification Search .. 178/18.01–20.04; 341/5; 345/156–157, 179; 715/700–866
See application file for complete search history.

(56) References Cited

U.S. PATENT DOCUMENTS

| 4,878,553 | A | * | 11/1989 | Yamanami et al. ...... 178/18.07 |
| 5,571,997 | A | * | 11/1996 | Gray et al. ............. 178/19.04 |
| 6,067,073 | A | * | 5/2000 | Rae-Smith et al. ......... 345/589 |
| 2005/0275638 | A1 | * | 12/2005 | Kolmykov-Zotov et al. ..... 345/179 |

* cited by examiner

*Primary Examiner*—Amr A. Awad
*Assistant Examiner*—Michael Pervan
(74) *Attorney, Agent, or Firm*—Pillsbury Winthrop Shaw Pittman, LLP

(57) ABSTRACT

A handwriting pen used in a tablet type handwriting entry device comprises a pen tip, a pen tip position sensor, and a pressure sensor. The pen tip position recognizer captures a main position coordinates as the pen tip taps on a tablet panel, and generates a main position data. The pressure generator senses a press by the pen tip on the tablet, and generates a pressure value. The handwriting pen connects to a main system by a signal transmission line, and the acquired information is transferred to the main system. The main system has a pen stroke simulation apparatus that manipulates the main position data and the pressure value for simulating different pen strokes.

18 Claims, 18 Drawing Sheets

HANDWRITING PEN CAPABLE OF SIMULATING DIFFERENT STROKES

This application claims priority of Taiwanese application no. 092125437 and 092125435, filed on Sep. 16, 2003.

BACKGROUND OF THE INVENTION

1. Field of the Invention

The present invention relates to a handwriting pen and more particularly relates to a handwriting pen capable of simulating different pen strokes.

2. Description of the Prior Art

Recently, handwriting entry devices emerge to form a new generation of input devices. In general, a handwriting device comprises a handwriting tablet and a handwriting pen, supports user handwriting with a stylus directly on the tablet, and features an alternative means to replace the keyboard mode of input. Popularly seen handwriting devices are categorized into the following two types: Tablet PC, consisting of a flat-screen LCD panel and an electromagnetic sensitive touch-control pen; and WACOM digitizer or graphics tablet, consisting of a pressure sensitive graphics tablet or digitizing tablet, and a pressure sensitive pen. Moreover, the users have to install recognition software; for instance, Photoshop and the like graphics software in the computer system, for the recognition of what the users write or draw by means of the handwriting entry devices.

The recognition software has to recognize a position that the handwriting pen taps on the handwriting tablet, an (X, Y) coordinates; and pressing force with the handwriting done by an individual user, a pressure value Z, to simulate pen strokes of distinct styles. However, due to the deficiency in acquiring enough data, the existing graphics software; for instance, Photoshop, CorelDraw, Painter, etc, have tremendous deficiency in the simulation of the pen strokes.

SUMMARY OF THE INVENTION

Therefore, the main purpose of the present invention is to offer a handwriting pen an attribute of simulating different pen strokes, to accomplish the simulation of distinct styles of individual pen strokes according to the distinguishing feature of the hand press, and to further enhance the power of simulating the pen strokes by the graphics software.

The handwriting pen of the present invention comprises a pen tip; a pen tip position recognizer, capturing a main position coordinates of the pen tip on the handwriting tablet to generate a main position data; a pressure generator, sensing a value of pressure exerting by the pen tip on the handwriting tablet panel to generate a pressure value. The handwriting pen connects to main system by a signal transmission line through which the main position data and the corresponding pressure value are sent to the main system. The main system has a pen stroke simulation apparatus, which manipulates the main position data and the pressure value, and simulates the pen strokes of distinct styles. The pen stroke simulation apparatus comprises a pressure-radius transformation module, which receives the pressure value, and converts it into a radius data; a positive vector generation module, receiving the main position data through which a positive vector data is generated; a density location generation module, connecting to the pressure-radius. transformation module and the positive vector generation module, for generating a plurality of density locations to represent a plurality of density location coordinates in the direction of the positive vector at the main positions, according to the radius and the positive vector data; and a pen stroke generation module, drawing a main line of trajectory according to the pen tip sliding across the main positions over time, and drawing a plurality of density lines according to the density location data, wherein each main position data corresponds to a plurality of the density location data.

BRIEF DESCRIPTION OF THE DRAWINGS

The present invention featuring its novelty, can be readily understood by reading the following detailed description of the preferred embodiments, with reference made to the accompanying drawings, wherein.

DETAILED DESCRIPTION OF THE INVENTION

Figure 1:
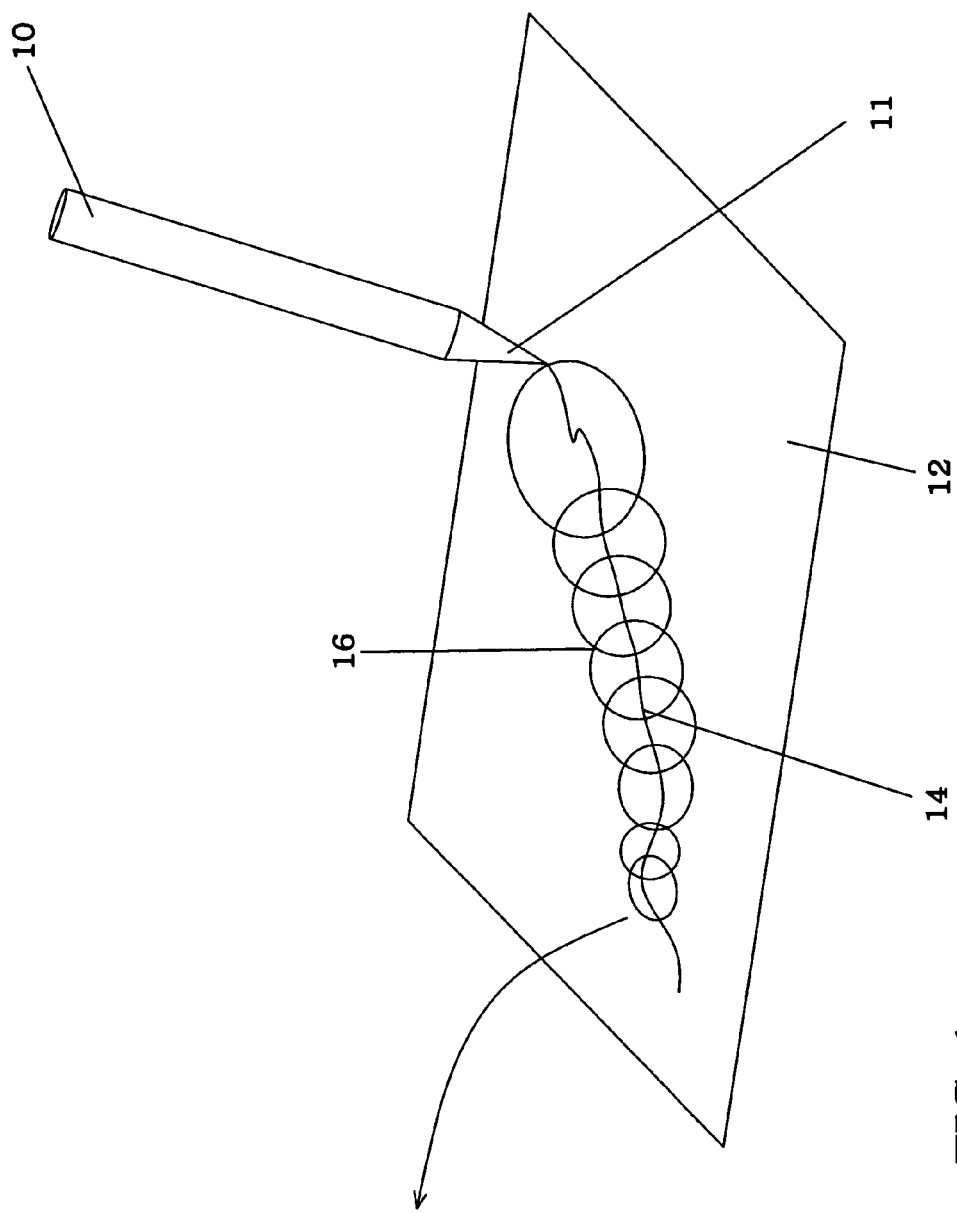
FIG. 1 shows a handwriting pen accompanying a handwriting tablet in the usage of the present invention.

Please refer to FIG. 1. FIG. 1 is an exterior view of the present invention, showing the usage of a handwriting pen 10 (detail structure will be described in the next paragraph) and an accompanying handwriting tablet 12. As shown in the figure, the handwriting pen 10 comprises a pen tip 11, where a user employs the handwriting pen 10 writing on the handwriting tablet 12 to accomplish a pen stroke 14 which is composed of a plurality of circles 16, where the center of the circle 16 is represented by O and the radius $\bar{\omega}$.

Figure 2:
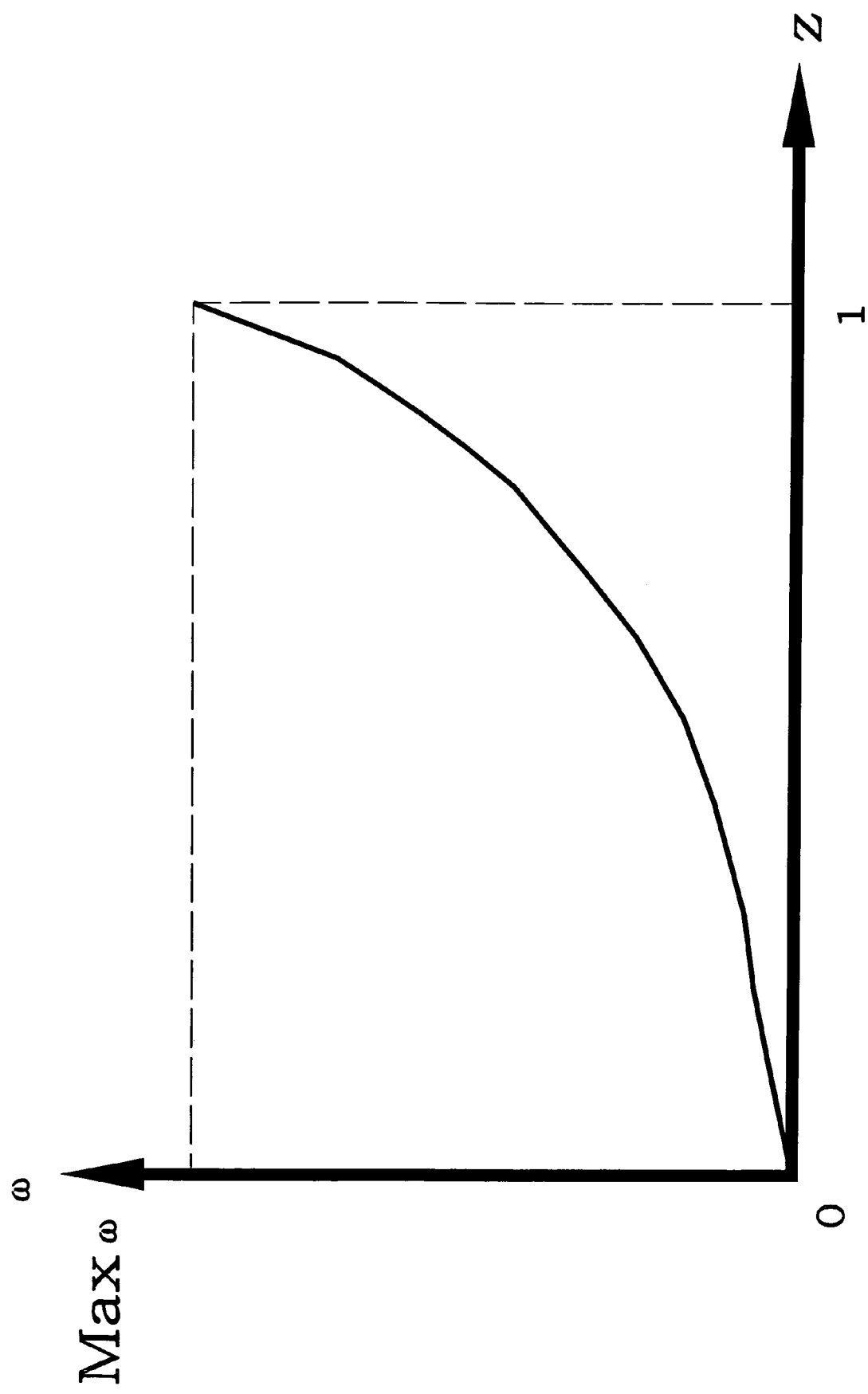
FIG. 2 shows a relationship between radiuses of circles and pressure values.

Please refer to FIG. 2. FIG. 2 shows a relationship between the radius $\bar{\omega}$ of circle 16 and pressure value Z. As shown in the figure, the harder the user presses down on the pen tip, the larger the pressure value Z of the handwriting pen 10 is, and hence the radius $\bar{\omega}$ of the circle 16 becomes lengthy. In other words, according to a variety of pressure values Z, the handwriting pen 10 over time generates a lot of circles 16 varied in size on the handwriting tablet to form the pen stroke 14, where Max$\bar{\omega}$ is a preset maximum value of radius.

Figure 3:
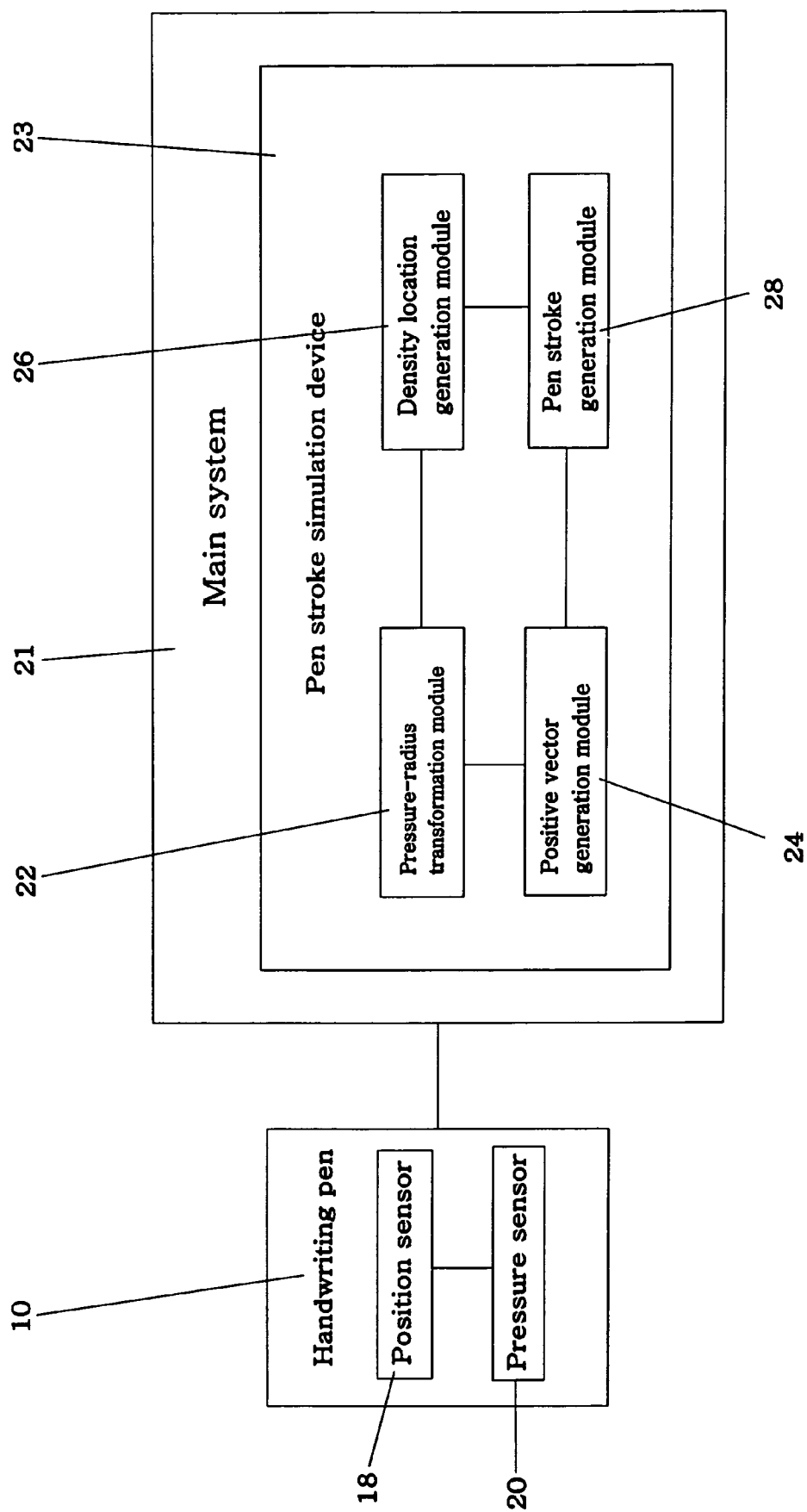
FIG. 3 is a schematic diagram of the present invention showing the handwriting pen connecting to a main system.

Please refer to FIG. 3. FIG. 3 is a schematic diagram of the present invention showing the handwriting pen 10 connecting to a main system 21. The handwriting pen 10 comprises a pen tip position sensor 18 and a pressure sensor 20. The pen tip position sensor 18 is used to capture a main position coordinates $O_i$, where the pen tip 11 taps on the handwriting tablet 12, for generating a main position data. The main position coordinates $O_i$ is the center of the circle 16 that the handwriting pen 10 generates over time $t_i$, which can be denoted as a coordinates $(X_i, Y_i)$. The pressure sensor 20 is used to sense the pressure that the pen tip 11 presses down on the handwriting tablet 12 to form a pressure value Z.

The handwriting pen 10 connects to the main system 21 by a signal transmission line (not shown) through which the main position data and corresponding pressure values are sent to the main system 21. The main system has a pen stroke simulation apparatus 23; for instance, graphics software or recognition software that manipulates the main position data and the pressure values, for simulating different pen strokes.

The pen stroke simulation apparatus 23 comprises a pressure-radius transformation module 22, a positive vector generation module 24, a density location generation module 26, and a pen stroke generation module 28. The pressure-radius transformation module 22 is used to acquire a pressure value Z, and through applying a pressure-radius transformation equation, the pressure value Z is thus transformed to a radius value $\overline{\omega}$. The pressure-radius transformation equation is established by the relationship between the radius $\overline{\omega}$ and the pressure value Z in FIG. 2, and represented as:

$$\begin{cases} \overline{\omega} = f(z) = (\text{Max}\overline{\omega}) * \left(\frac{e^z - 1}{e - 1}\right) \\ \text{where} \\ f(0) = 0 \\ f(1) = \text{Max}\overline{\omega} \\ 0 \leq Z \leq 1 \end{cases}$$

The positive vector generation module 24 is used to acquire the main position data through which a positive vector data is generated. The positive vector generation module 24 first acquires an instantaneous direction of the pen tip 11 at the main position coordinate $O_i$, according to the main position data, and the equation is expressed as:

$$V_i = \frac{O_i - O_{i-1}}{|O_i - O_{i-1}|};$$

where $V_i$ represents the instantaneous direction of the pen tip 11 over time $t_i$; $O_i$, the main position coordinates of the pen tip 11 over time $t_i$; and $O_{i-1}$, the main position coordinates of the pen tip 11 over time $t_{i-1}$. Suppose $V_i=(x, y)$, the positive vector data $N_i=(-y, x)$ The density location generation module 26, connects to the pressure-radius transformation module 22 and the positive vector generation module 24, employs the radius data $\overline{\omega}$ and the positive vector data $N_i$ to generate a plurality of density location data, in the direction of the positive vector over the main position coordinate $O_i$, and represents a plurality of density location coordinates $b_{i,j}$.

Figure 4:
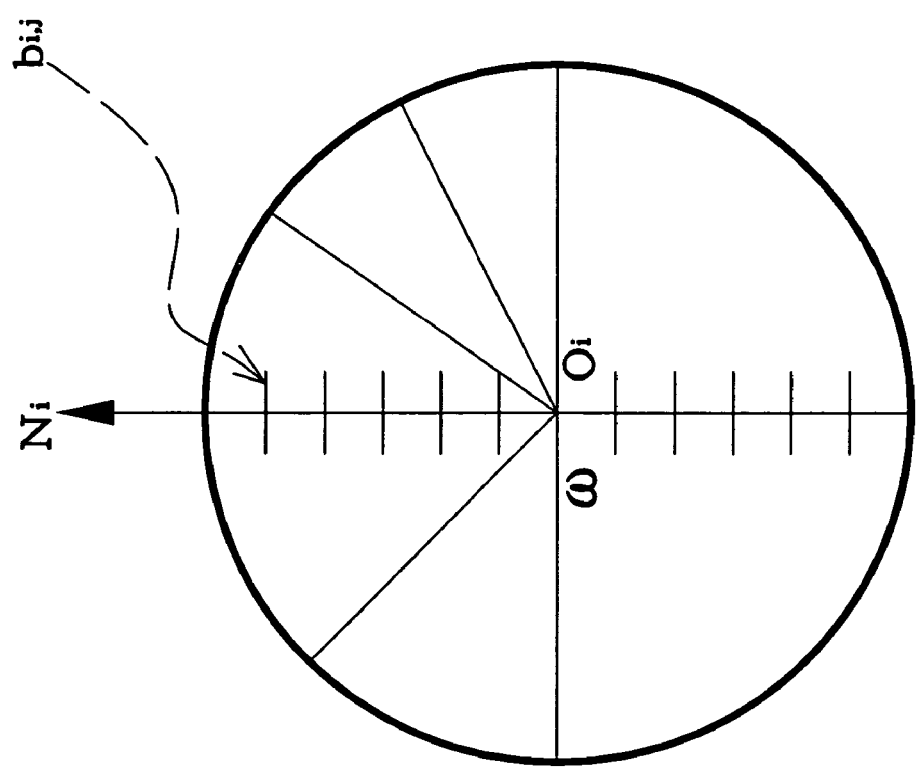
FIG. 4 shows a plurality of density location coordinates.

Please refer to FIG. 4. FIG. 4 shows a plurality of density location coordinates $b_{i,j}$. The density location generation module 26 employs a density location generation equation to generate a plurality of density location data $b_{i,j}$. The equation is represented as:

$$b_{i,j} = O_i + \overline{\omega}\left(\frac{j}{n} - 1\right) \cdot N_i$$

where $O_i$ represents the main position coordinates of the pen tip over time $t_i$; $\overline{\omega}$, the radius; $N_i$, the positive vector; n, a preset system value, used to decide the number of density locations; and $b_{i,j}$ the $j^{th}$ density location coordinates of the $i^{th}$ main position coordinates. On the other hand, the pen stroke 14, drawn by the handwriting pen 10, comprises m main positions, and each main position corresponds to n density locations. As shown in the diagram, the main position coordinate $O_i$ corresponds to a plurality of density location coordinates $b_{i,j}$.

Figure 5:
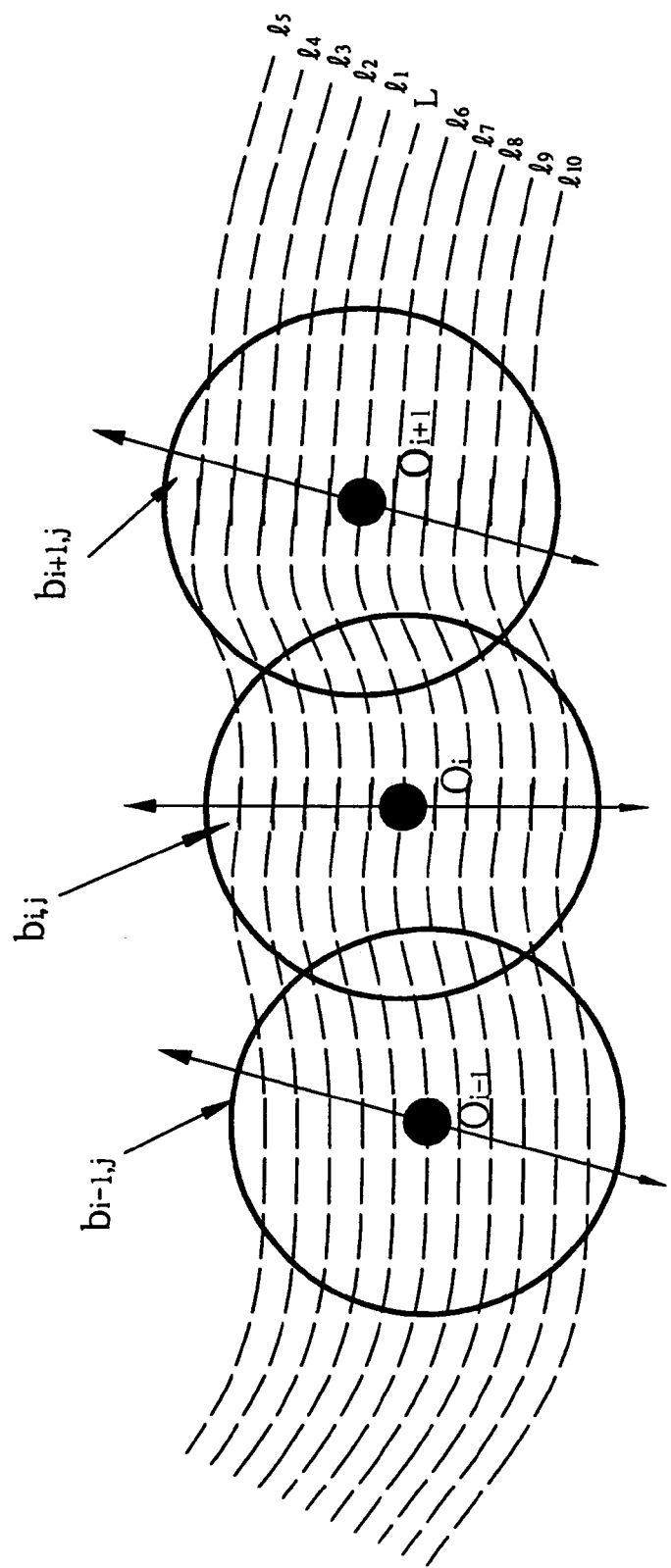
FIG. 5 shows a main line and density lines.

Please refer to FIG. 5. FIG. 5 shows a main line L and density lines $l_1 \sim l_{10}$. The pen stroke generation module 28 is used to draw the main line L according to the pen tip 11 sliding across the main position coordinates $O_{i-1}$, $O_i$, and $O_{i+1}$ over time $t_{i-1}$, $t_i$, and $t_{i+1}$, and to draw the density lines $l_1 \sim l_{10}$ based on the density location coordinates $b_{i-1,j}$, $b_{i,j}$, and $b_{i+1,j}$. As shown in the figure, each main position coordinate corresponds to 10 density location coordinates.

Figure 6:
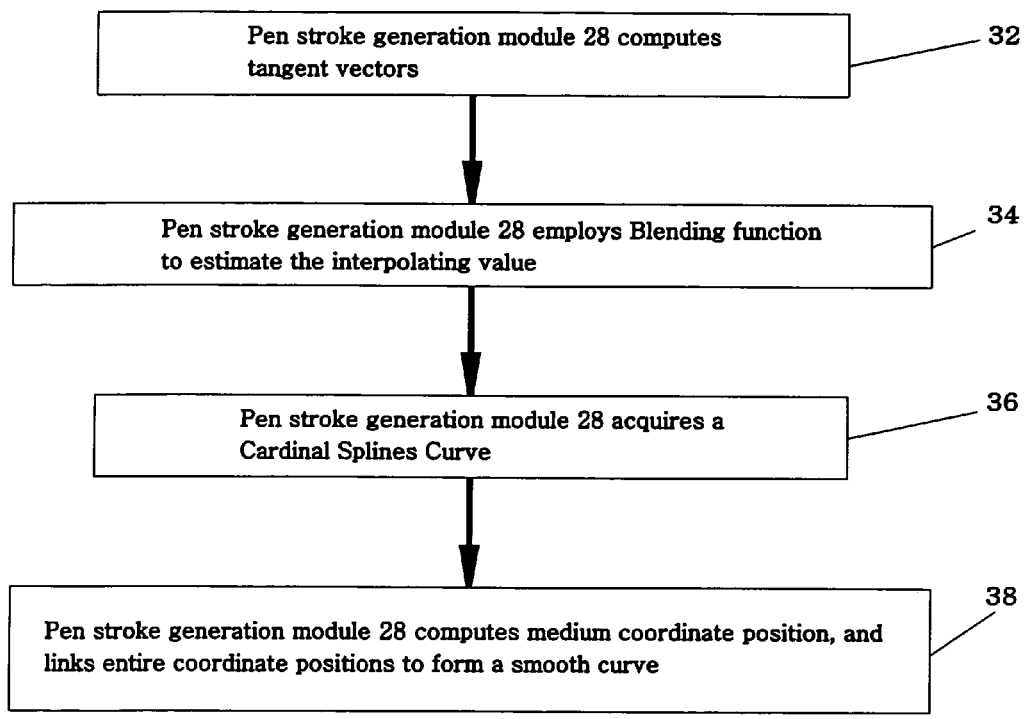
FIG. 6 is a flow diagram showing a pen stroke forming method of a pen stroke generation module.

Please refer to FIG. 6. FIG. 6 is a flow diagram showing a pen stroke forming method 30 of the pen stroke generation module 28. The pen stroke generation module 28 employs the pen stroke forming method 30 to form the main line L and the related density lines $l_1 \sim l_{10}$. Suppose the main line L is formed by m main position coordinates and each main position coordinates corresponds to n density location coordinates, the example shown in FIG. 5 has m=3 and n=10.

In step 32, the pen stroke generation module 28 computes the tangent vectors, $T_i$ and $T_{i+1}$, of the $i^{th}$ and $(i+1)^{th}$ position coordinates. The equation is as follows:

$$\begin{cases} T_{i+1} = a * (P_{i+1} - P_i) \\ a \in [0, 1] \end{cases} ;$$

where $P_{i+1}$ is the $(i+1)^{th}$ position coordinate, and $P_i$ is the $i^{th}$ position coordinate.

In step 34, the pen stroke generation module 28 employs Blending functions to estimate the interpolating value between the $i^{th}$ and the $(i+1)^{th}$ position coordinates. The Blending functions are shown as follows:

$$\begin{cases} h_1(s) = 2s^3 - 3s^2 + 1 \\ h_2(s) = -2s^3 + 3s^2 \\ h_3(s) = s^3 - 2s^2 + s \\ h_4(s) = s^3 - s^2 \\ 0 \leq s \leq 1 \end{cases}.$$

In step 36, the pen stroke generation module 28 acquires a Cardinal Splines Curve, and the equation is:

$$\vec{P} = \vec{P}_i * h_1 + \vec{P}_{i+1} * h_2 + \vec{T}_i * h_3 + \vec{T}_{i+1} * h_4.$$

Finally, in step 38, the pen stroke generation module 28 computes the medium coordinate position between the $i^{th}$ and the $(i+1)^{th}$ position coordinates, and links the entire coordinate positions to form a smooth curve. The equation of the medium coordinate position is:

$P = S*h*C$; where $$S = \begin{bmatrix} s^3 \\ s^2 \\ s^1 \\ 1 \end{bmatrix} \quad C = \begin{bmatrix} P_i \\ P_{i+1} \\ T_i \\ T_{i+1} \end{bmatrix} \quad h = \begin{bmatrix} 2 & -2 & 1 & 1 \\ -3 & 3 & -2 & -1 \\ 0 & 0 & 1 & 0 \\ 1 & 0 & 0 & 0 \end{bmatrix}.$$

Figure 7:
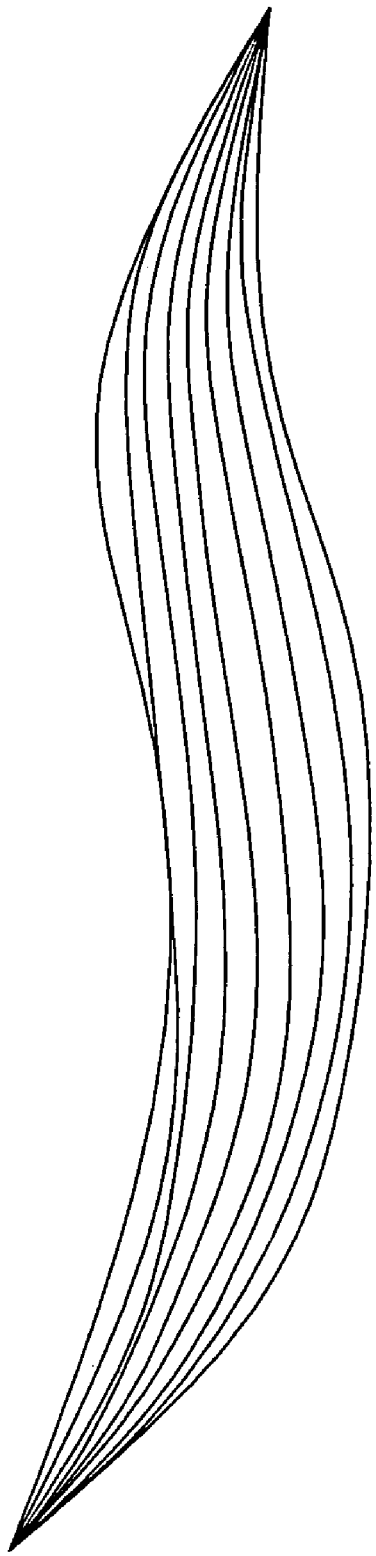
FIG. 7 is a schematic diagram showing a pen stroke formed by the pen stroke generation module.

Please refer to FIG. 7. FIG. 7 is a schematic diagram showing a pen stroke formed by the pen stroke generation module 28. After the pen stroke generation module 28 employs the pen stroke forming method 30 to link all the main position coordinates into the main line, and links all the density location coordinates into density lines, the pen stroke shown in FIG. 7 is obtained.

Moreover, the pen stroke generation module 28 consists of a variety of parameter generation modules, used for allocating various parameters for simulating different styles of pen strokes.

Figure 8:
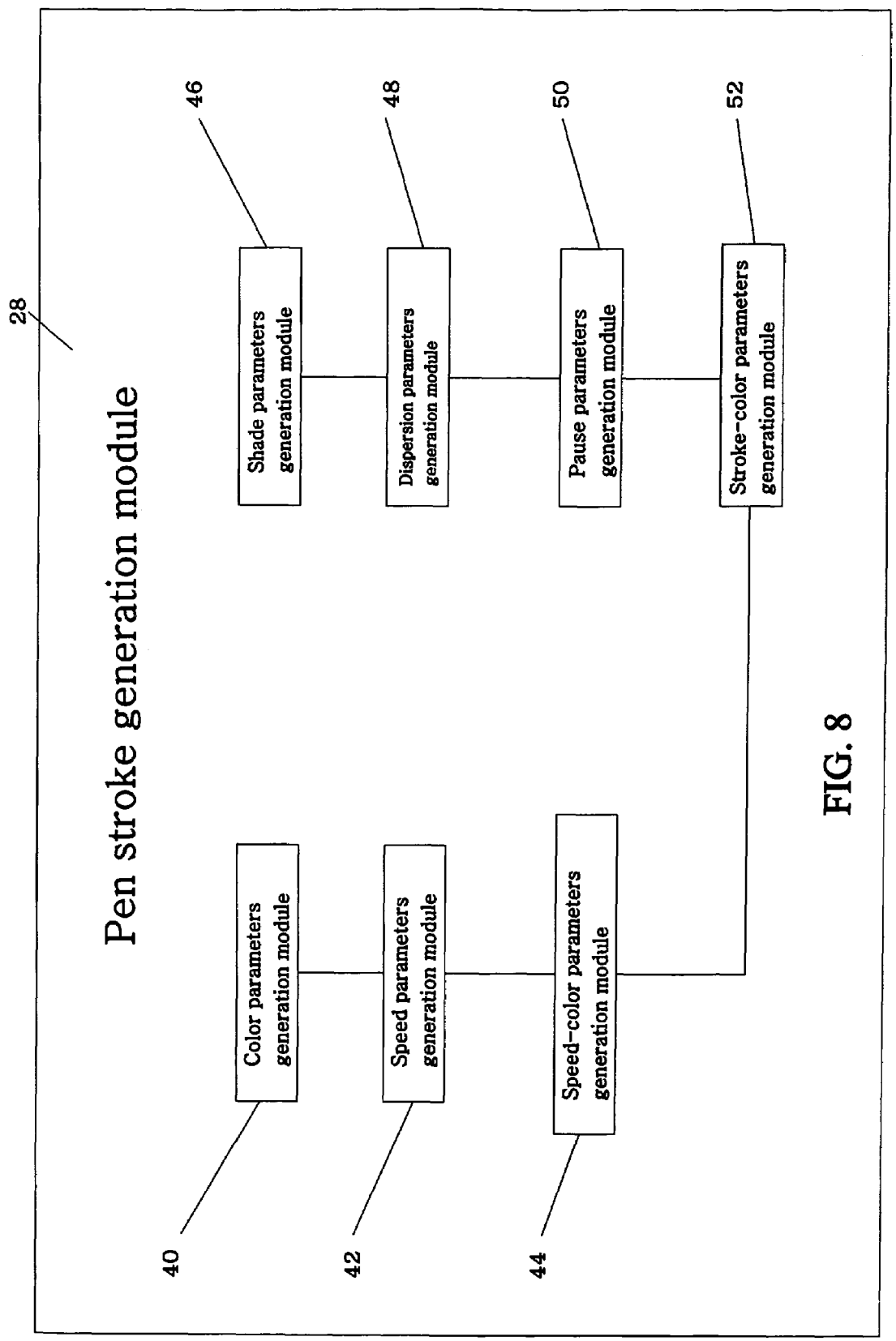
FIG. 8 is a block diagram of the pen stroke generation module.

Please refer to FIG. 8. FIG. 8 is a block diagram of the pen stroke generation module 28. The pen stroke generation module 28 comprises a color parameters generation module 40, a speed parameters generation module 42, a speed-color parameters generation module 44, a shade parameters generation module 46, a dispersion parameters generation module 48, a pause parameters generation module 50, and a stroke-color parameters generation module 52.

The color parameters generation module 40 generates color parameters relative to the main position data and the density location data by a random number generator (not shown), for determining the color of each position at the main line L and the density lines $l_1 \sim l_{10}$. The color parameters generation module employs a color parameters generation equation to form the color parameters $\rho_i$. The equation is as follows:

$$\begin{cases} \rho_i = \rho_1 + \|rand()\| \%(\rho_2 - \rho_1 + 1) \\ \text{where} \\ \rho_1 \le \rho_i \le \rho_2 \\ \rho_1, \rho_2 \in [0, 255] \end{cases} ;$$

where $\rho_1$ and $\rho_2$ are preset system values.

In general, the values of $\rho_1$ and $\rho_2$ are set rather closer to each other to avoid considerable difference.

The speed parameters generation module 42 generates speed parameters, relative to the main position data and the density location data, to represent the instantaneous speed of the handwriting pen 10 at each position. The speed parameters generation module 42 employs a speed parameters generation equation to generate the speed parameter V. The equation is as follows:

$$V = f(v) = \left( \frac{v_{max}^3 - 3v_{max}v^2 + 2v^3}{v_{max}^3} \right);$$

where v represents the instantaneous speed of the handwriting pen 10 at the main position coordinates, and $v_{max}$ represents a maximum preset speed value.

During writing, due to the varying of the instantaneous speed, the ink presents a different degree of density. In general, the faster the instantaneous speed, the paler in color of the ink is. Therefore, the speed-color parameters generation module 44 generates speed-color parameters according to the color parameters and the speed parameters, for exhibiting the above relationship between the instantaneous speed and the density of the ink. The speed-color parameters generation module 44 employs a speed-color parameters generation equation to generate the speed-color parameter $\rho_i'$. The equation is as follows:

$$\rho_i' = \rho_i * V$$

The shade parameters generation module 46 generates shade parameters according to the pressure value Z, relative to the main position data and the density location data. Writing or drawing with a soft pen such as a writing brush or a watercolor pen, usually makes the ink paler by the repeated depictions. Therefore, the main position data would possess a maximum value of the shade parameters, and the farther the distance from the main position coordinates, the smaller the shade parameter value of the density location data is; such that the main line L is the deepest, while a density line appears paler as it separates farther from the main line L, exhibiting a situation of shade gradient.

In general, the pressure gets lower; that is, a gentle pressing on writing, it is obvious that the shade of a pen stroke gets paler, and the shade changing is less obvious while reversely. For instance, with a harsh pressing on writing, the shade of the stroke is usually thick and homogeneous, and it is rare to be a tint. Therefore, according to the above description, the shade parameters generation module 46 generates the shade parameters based on the pressure value Z.

Besides, the shade parameters generation module 46 employs a shade parameters generation equation to form shade parameter $\lambda$. The equation is as follows:

$$\lambda = (1 - \lambda_0)(1 - e^{-az}) + \lambda_0;$$

where a is a user defined constant; z, the pressure value; and $\lambda_0$, a present value of the shade parameters.

As a harsh pressing on writing, the shade of the pen stroke is especially thick and extremely homogeneous, and it is not likely to be in a tint; therefore, as the value of the pressure in the above equation exceeds a certain predefined value, the shade parameter would be a constant.

In general, the writing or drawing by writing brush or a watercolor pen usually appears a phenomenon of being dispersed or diffused; therefore, each pen stroke exhibits a different degree in width. The longer the pen tip stays, the considerable the degree of being dispersed, and the dispersion parameters generation module 48 is used to simulate the phenomenon of dispersion.

The dispersion parameters generation module 48 generates a plurality of dispersion positions according to the main positions and the radii $\bar{\omega}$, for representing a plurality of dispersion position coordinates.

Figure 9:
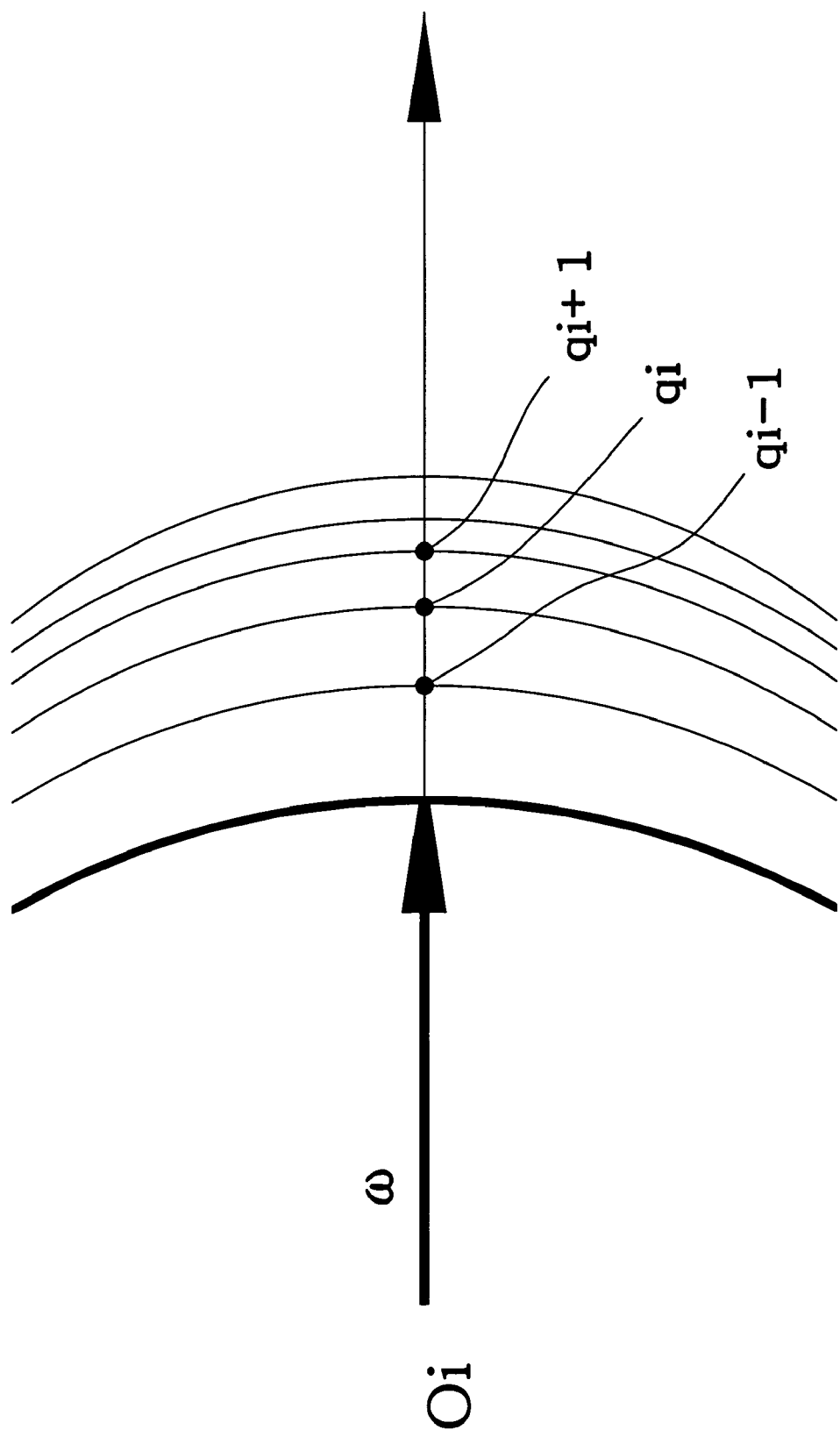
FIG. 9 shows dispersion position coordinates.

Please refer to FIG. 9. FIG. 9 is a schematic diagram of the dispersion position coordinates $q_i$. Each main position corresponds to a plurality of dispersion positions, which means that each main position coordinates $O_i$ corresponds to a plurality of dispersion position coordinates $q_i$. The dispersion parameters generation module 48 consists of a dispersion parameters D, which is used to decide the distance between every two of the dispersion position coordinates $q_i$, and employs a dispersion position generation equation to generate dispersion positional coordinates, such that the farther the distance from the main position coordinates $O_i$, the shorter the distance between the dispersion positional coordinates $q_i$ is. The equation is as follows:

$$\frac{\partial q}{\partial t} = D\nabla^2 q;$$

where the equation is expanded by employing the finite difference method:

$$\Rightarrow \frac{q_{i+1} - q_{i-1}}{2t} = D \cdot (q_{i+1} - 2q_i + q_{i-1})$$

$$\Rightarrow q_{i+1} = q_{i-1} + 2Dt \cdot q_{i+1} - 4Dt q_i + 2Dt q_{i-1}$$

$$\Rightarrow q_{i+1} = \left(\frac{1}{1-2Dt}\right)(-4Dt q_i + (1+2Dt)q_{i-1}).$$

As in the foregoing description, the extend, beyond the radius $\overline{\omega}$, would confront a plurality of the dispersion position coordinates, and the distance falls between the dispersion position coordinates is gradually decreasing, and eventually approaching zero. Therefore, as a pen stroke is being formed, it tends to stretch outward, and the stretching rate would gradually decrease, eventually approaching zero. According to the different values assigned to the dispersion parameters D, the variations of the stretching rate also vary, and further exhibiting a different degree of dispersion.

The foregoing description is about simulating the variations in position for the phenomenon of dispersion; as for the variations in color, it is available to apply it in the above equation to obtain the variations in color for the phenomenon of dispersion. Therefore, each dispersion position data mentioned above corresponds to a dispersion color data, while the dispersion parameters generation module 48 utilizes the dispersion parameters D too, for determining the variations in color between every two of the dispersion color data, and employs the foregoing equation to generate the dispersion color data; such that the farther the dispersion position from the main position, the smaller the variance between the dispersion color data is. Hence, it appears an effect of dispersion that the shade of color gets paler gradually.

Furthermore, the pen stroke 14 may encounter a pause, subject to the different materials of the brush pen or watercolor pen; that is, certain portions of the pen stroke 14 are vacant, and the pause parameters generation module 50 is used to simulate the phenomenon of the pauses herein.

The pause parameters generation module 50 generates pause parameters, mapping to the main position and the density locations, for determining whether the main position and the density locations are to be seen. The pause parameters generation module 50 consists of a pause parameters preset table, possessing a plurality of the pause parameters, for corresponding to the main position data and the density location data. As a pause parameter is set to a first value, the corresponding position will be shown up; otherwise, a setting of a second value will disable the appearance of the corresponding position.

Therefore, through the pause parameters setting, certain portions of the pen stroke 14 are vacant, which makes the line an aspect of pauses. The pause parameters d can be represented as:

$$d = d\text{Table}(i);$$

where $d \in [0, 1]$.

If pause parameters equal 0, the actual point location of the corresponding position data is blank; otherwise, a value of 1 enables the appearance of the actual point location.

In addition to the generation of each parameter setting by the above parameters generation modules respectively, the pen stroke generation module 28 yet includes a stroke-color parameters generation module 52, and combines a couple of the above parameters to produce a stroke-color parameters.

The stroke-color parameters generation module 52 generates the stroke-color parameters according to the color parameters $\rho_i$, by the color parameters generation module 40; the rate parameters V, by the rate parameters generation module 42; the shade parameters $\lambda$, by the shade parameters generation module 46; and the pause parameters d, by the pause parameters generation module 50. The stroke-color parameters generation module 52 employs a stroke-color parameters generation equation to compute the stroke-color parameters $C_{i,j}$. The equation is represented by:

$$C_{i,j} = \lambda * C_{i,j-1} * d * V;$$

As described in the above, the pen stroke 14, drawn by the handwriting pen 10, comprises m main position data, and each main position data corresponds to n density location data, where $C_{i,j}$ represents the stroke-color parameters to which the $j^{th}$ density location coordinates of the $i^{th}$ main position coordinates corresponds.

Figure 10:
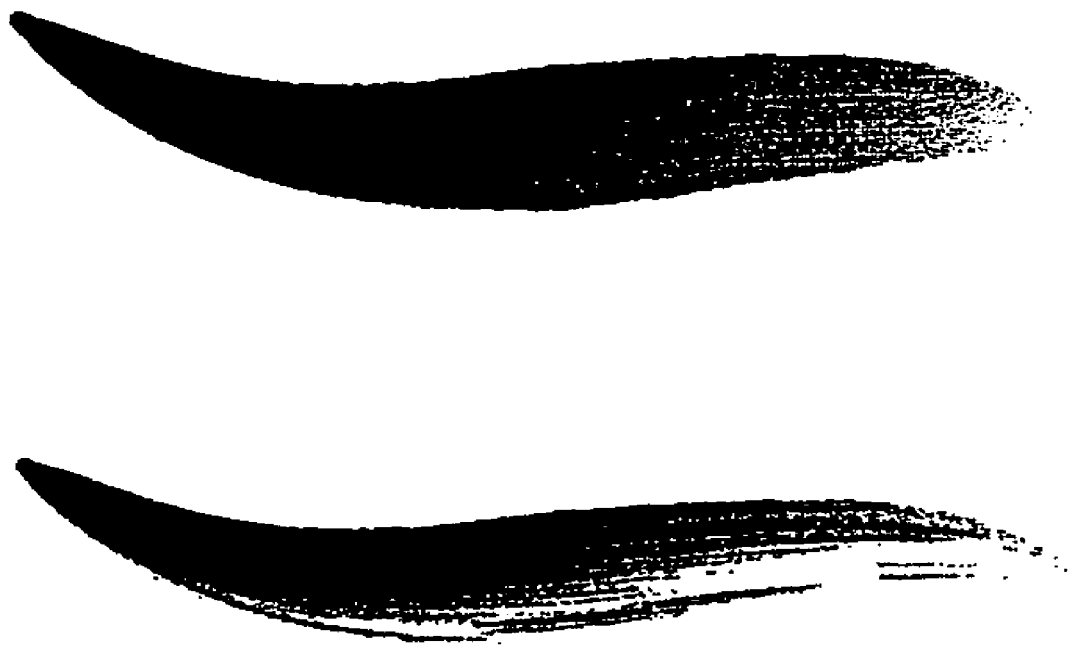
FIG. 10 is a schematic diagram of different pen strokes.

Please refer to FIG. 10. FIG. 10 is a schematic diagram of different pen strokes. By applying the handwriting pen 10 of the present invention, it is available to simulate a variety of pen strokes of which the figure shows only two kinds, and the main system 21 puts the simulated pen strokes on the connecting screen.

Figure 11:
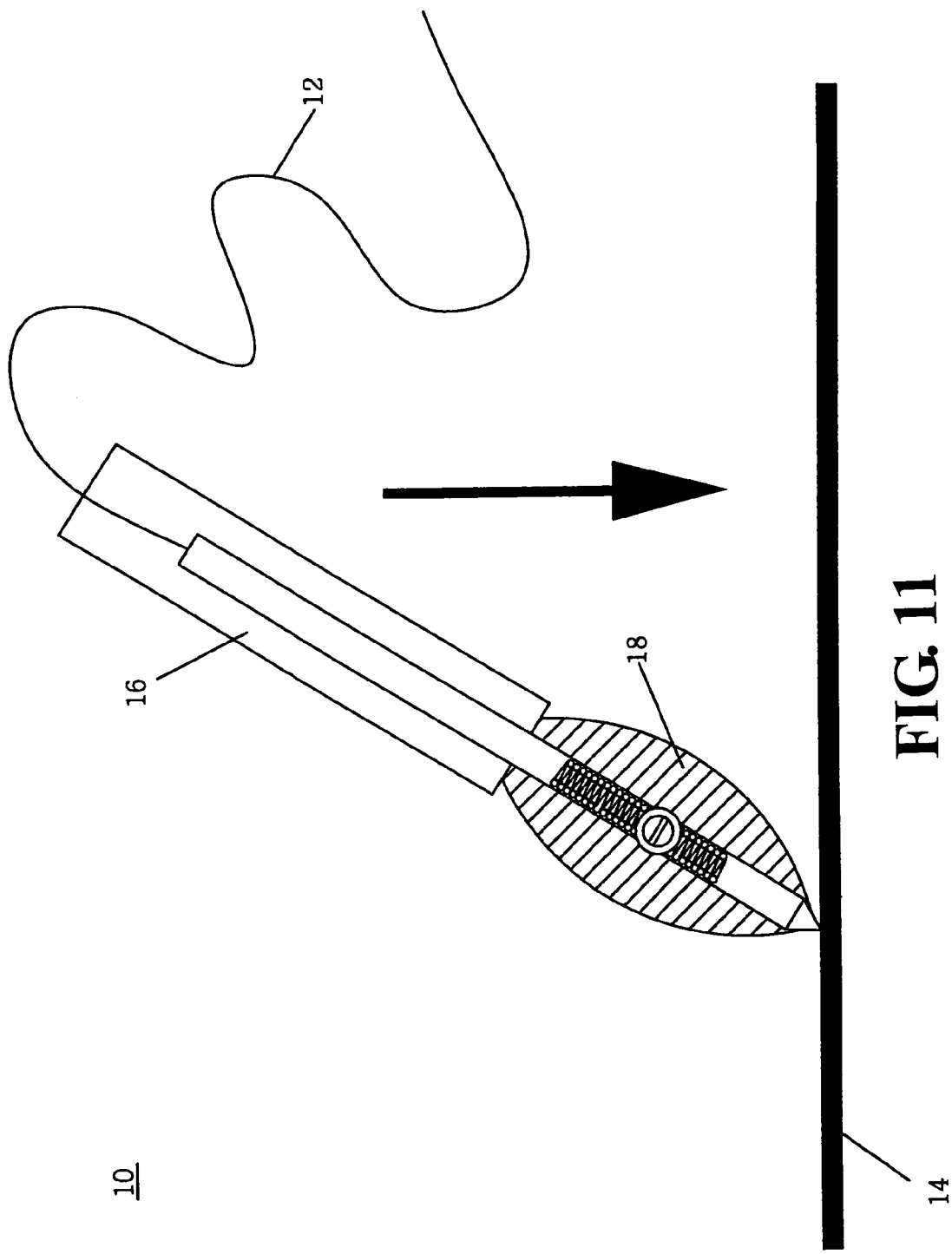
FIG. 11 is a schematic diagram of the handwriting pen of the present invention.

Please refer to FIG. 11. FIG. 11 is a schematic diagram of the handwriting pen 100 of the present invention. The handwriting pen 100 connects to the main system (not shown) by a signal transmission line 120; for instance, a computer, and the usage of the handwriting pen 100 is associated with a handwriting tablet 140. As shown in the figure, the handwriting pen 100 comprises a pen stick 160, and a pen head 180 fixed at one end of the pen stick 160. The pen head 180 is made of soft materials, such as rubber or plastic; a common trait of them is their shapes deformed under pressure, and restoring as the pressure releases. As shown in FIG. 11, the shape of the pen head 180 imitates the geometrical outline of the brush pen, and simulates the pen stroke of the brush pen.

Figure 12:
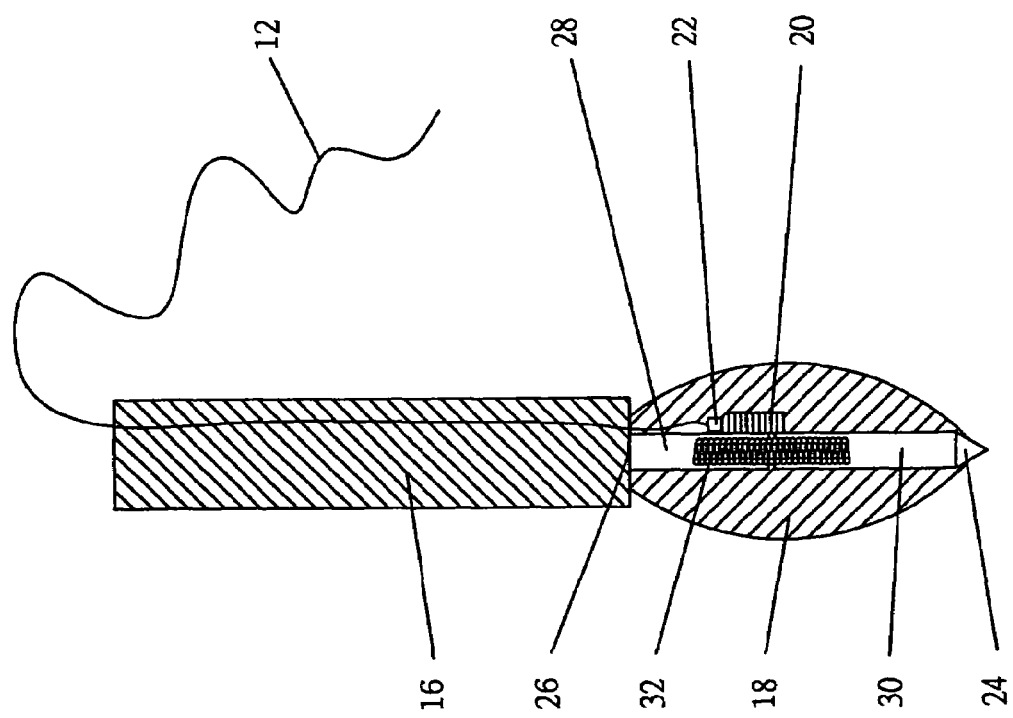
FIG. 12 is a system structure diagram of the handwriting pen.

Please refer to FIG. 12. FIG. 12 is a system structure diagram of the handwriting pen 100. The handwriting pen 100 again comprises a gear 200, a rotational velocity detector 220, a pen tip 240, and a central stick 260. The central stick 260 comprises a first stick 280, extending from the pen stick 160 into the pen head 180; a second stick 300, locating inside the pen head 180; and a spring 320, joining the first stick 280 to the second stick 300. The spring 320 could be a torsion one or an extension one, such that the handwriting pen 100 bends under pressure, and restores at pressure diminishing.

As shown in FIG. 12, the pen tip 240 is fixed at one end of the second stick 300, extending beyond the pen head 180;

and the gear 200 is fixed at the lateral of the central stick 260, located in between the first stick 280 and the second stick 300. The rotational velocity detector 220 is fixed at the lateral of the first stick 280, and located on the top of the gear 200. The rotational velocity detector 220 detects the variation of magnetic force during the rotation of the gear 200, and computes the instantaneous velocity of rotation according to diameter and length of cog of the gear 200. The rotational velocity detector 220 can be realized by adopting Philips manufactured KMI22/1 apparatus, which not only detects the rotational velocity of gear 200, but computes its rotational direction.

Figure 13:
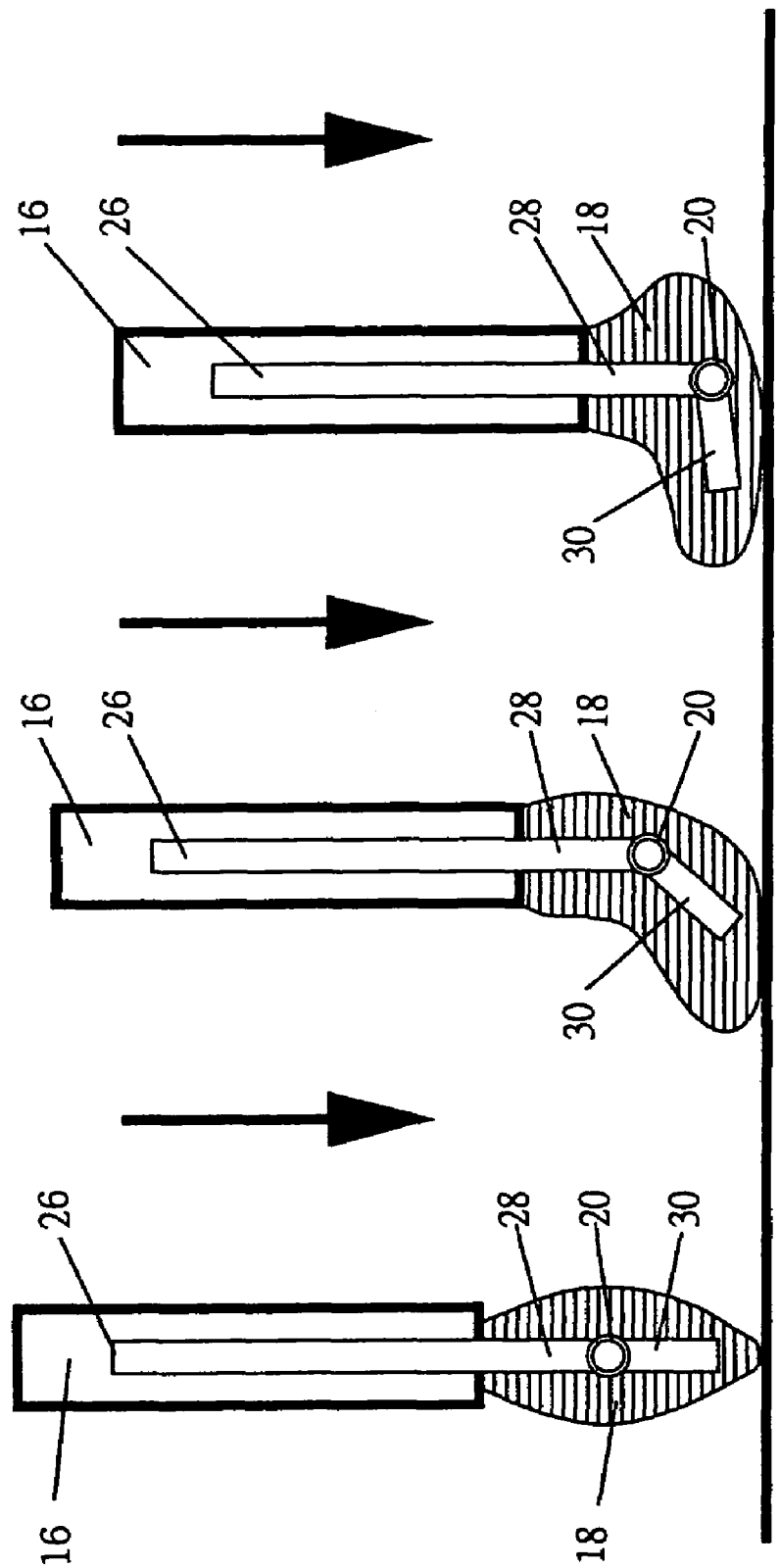
FIG. 13 is a schematic diagram of the handwriting pen undergoing a deformation at its pen head.

Please refer to FIG. 13. FIG. 13 is a schematic diagram of the handwriting pen 100 undergoing a deformation at its pen head 180. Since the pen head 180 of the handwriting pen 100 is made of soft material, it will come across a degree of deformation, subject to the different pressing force of individuals. As shown in the figure, once the pen head 180 deforms, the spring 320 would bend under that force. Due to the spring 320 joining the first stick 280 to the second stick 300, as the spring 320 confronts a degree of bending by a variant force, the angle between the first stick 280 and the second stick 300 varies proportionally too. Besides, since the gear 200 is located between the first stick 280 and the second stick 300, the changing of the angle between the two sticks causes the gear 200 rotating a proportion, which consists of variations both in speed and direction. In other words, as the pen head 180 deforms, the gear 200 undergoes a proportion of rotation accordingly.

Figure 14:
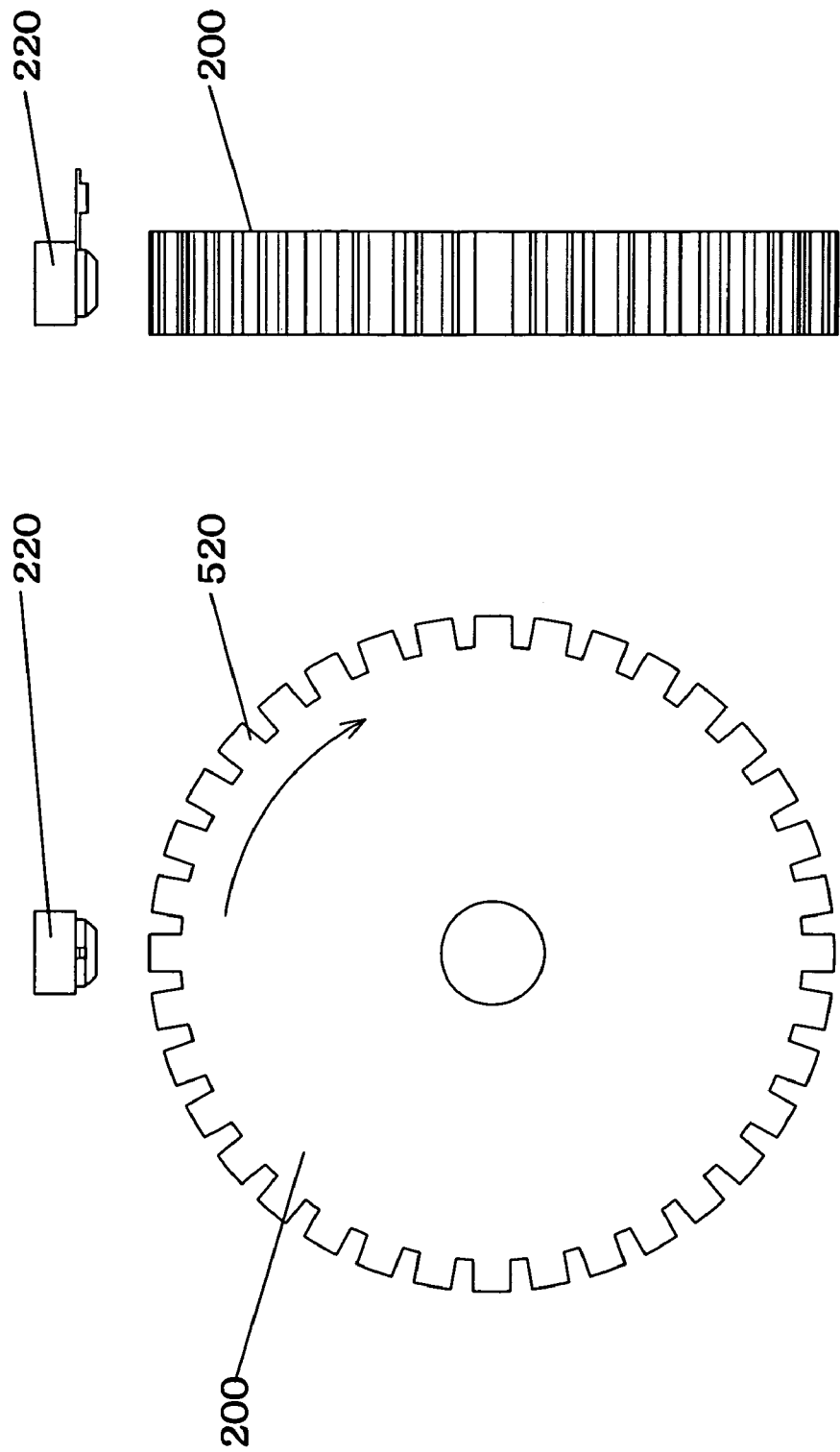
FIG. 14 is a schematic diagram of a gear and a rotation velocity detector of the handwriting pen

Please refer to FIG. 14. FIG. 14 is a schematic diagram of the gear 200 and the rotational velocity detector 220 of the handwriting pen 100. The rotational velocity detector 220 is located on the top of the gear 200. The gear 200 has a plurality of cogs 520. As the gear 200 rotates, the rotational velocity detector 220, on the top of the gear 200, detects its rotation, and counts a rotational velocity and a rotational direction according to the diameter and the length of the cog of the gear 200.

Figure 15:
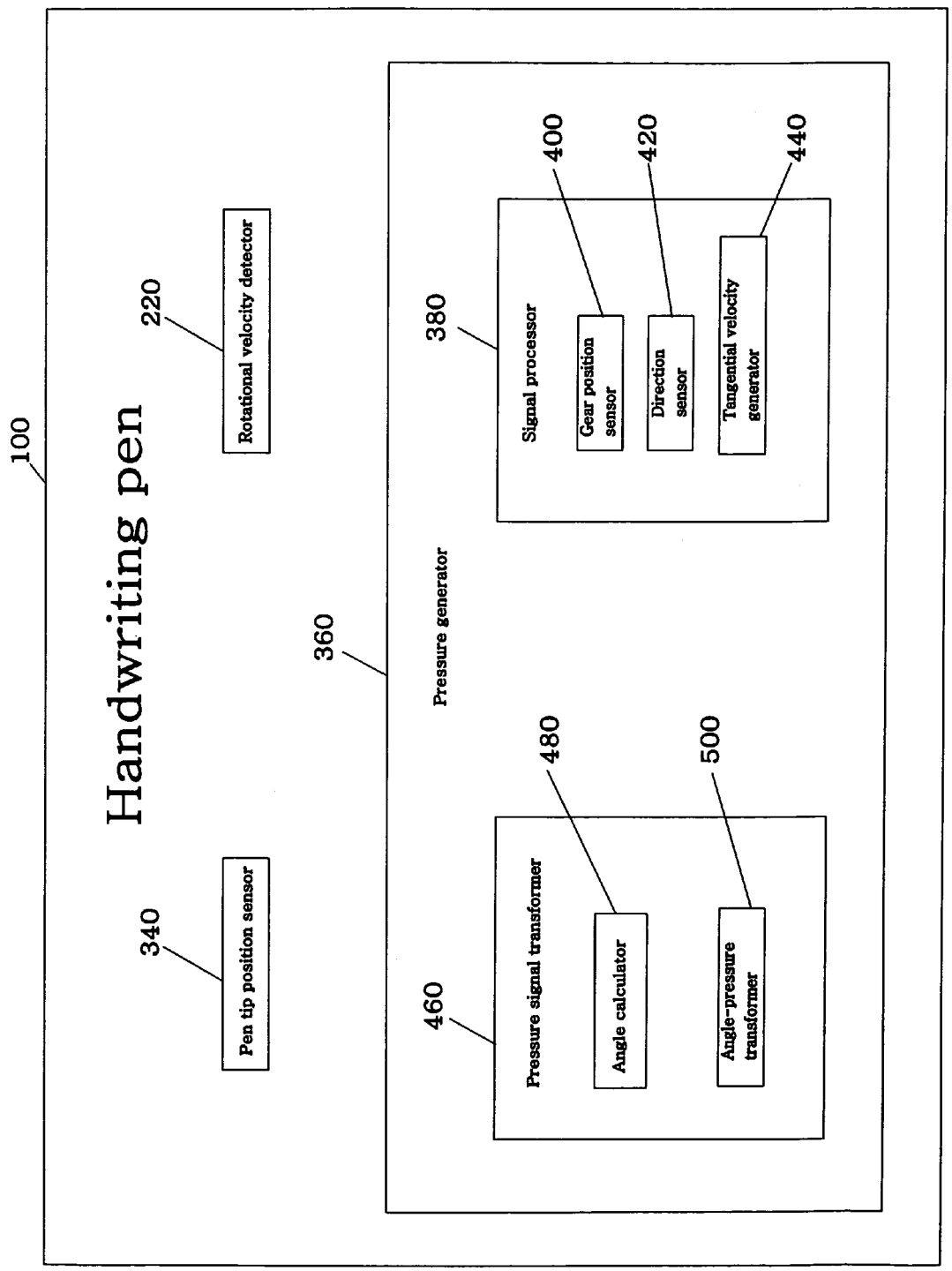
FIG. 15 is a circuit block diagram of the handwriting pen.

Please refer to FIG. 15. FIG. 15 is a circuit block diagram of the handwriting pen 100. The handwriting pen 100 further comprises a pen tip position sensor 340, fixed in the pen tip 240, for sensing the position coordinates (X, Y) of the pen tip 240 on the handwriting tablet 140; and a pressure generator 360, connected to the rotational velocity detector 220, for receiving the rotational velocity data and the rotational direction data of the gear 200, and generating a pressure value Z according to the rotational velocity data and the rotational direction data. The position coordinates (X, Y) accompanying the pressure value Z, are transferred to the main system by the signal transmission line 120.

As shown in FIG. 15, the pressure generator 360 comprises a signal processor 380, for receiving the rotational velocity data and the rotational direction data of the gear 200, and generating a tangential velocity of the gear 200 according to the rotational velocity data and the rotational direction data; and a pressure signal transformer 460, connected to the signal processor 380, for receiving the tangential velocity, and generating the pressure value Z according to the tangential velocity.

The signal processor 380 comprises a gear position sensor 400, a direction sensor 420, and a tangential velocity generator 440. The gear position sensor 400 is used to sense rotational position of the gear 200. As the gear position sensor 400 senses a cog 520 of the gear 200, it will signal a position. The direction sensor 420 is used to sense rotational direction of the gear 200 and to signal a direction. Once the rotational direction of the gear 200 is clockwise, the direction signal is 1; otherwise, −1 for a counterclockwise rotational direction.

The tangential velocity generator 440 connects to the position sensor 400 and the direction sensor 420, for receiving the position signal and the direction signal. The tangential velocity generator 440, employs a quotient, dividing perimeter of the gear 200 by the number of cogs to compute distance between two cogs 520; employs another quotient, dividing the distance between cogs by time interval of two position signals to compute the tangent rotational speed of the gear 200; and applies the direction signal, determining the direction of the tangent rotational speed, and obtaining the resulting tangential velocity. The equation of calculating the tangential velocity is as follows:

$$V_t = \pm 1 \times P/N_c \times 1/T_i;$$

where $V_t$: tangential velocity

P: perimeter of the gear $N_c$: number of cogs $T_i$: time interval.

As shown in FIG. 15, the pressure signal transformer 460 comprises an angle calculator 480 and an angle-pressure transformer 500. The angle calculator 480 is used to receive the tangential velocity, generated by the tangential velocity generator 440, and to compute bending angle $\theta_2$ of the pen head 180 according to the tangential velocity; while the angle-pressure transformer 500 is connected to the angle calculator 480, used to receive the bending angle $\theta_2$, and to generate the pressure value Z according to the bending angle $\theta_2$.

Figure 16:
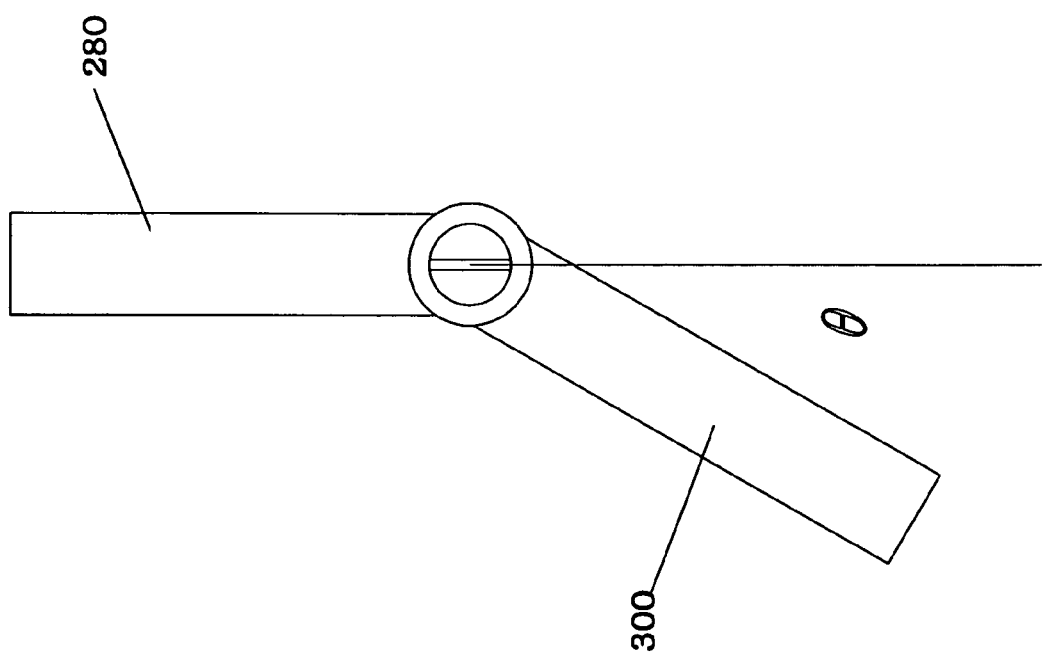
FIG. 16 shows a bending angle of a pen head.

Please refer to FIG. 16. FIG. 16 is a schematic diagram of the bending angle of the pen head 180. As shown in the above, as the pen head 180 deforms into a bend, the angle between the first stick 280 and the second stick 300 varies proportionally. In the current example, the bending angle $\theta_2$ is defined as the angle θ in FIG. 6.

To compute the bending angle $\theta_2$ of the pen head 180 over time t+Δt, the angle calculator 480 has to have the following known parameters: r represents the length of the pen head 180; $\theta_1$, the bending angle of the pen head 180 over time t; $\partial_1$, the angular acceleration of the gear 200 rotates over time t; $\overline{\omega}_1$, the angular velocity of the gear 200 rotates over time t; and Δt, a unit time.

The tangential velocity, received by the angle calculator, is represented by $v_2$, which is the tangential velocity of the gear 200 over time t+Δt. The equation of the angular velocity $\overline{\omega}_2$ of the gear 200 rotates over time t+Δt is:

$$\overline{\omega}_2 = \frac{v_2}{r}.$$

Also, the equation of the angular acceleration $\partial_2$ of the gear 200 rotates over time t+Δt is:

$$\partial_2 = \frac{(\overline{\omega}_2 - \overline{\omega}_1)}{\Delta t}.$$

The bending angle $\theta_2$ is:

$$\theta_2 = \theta_1 + \varpi_1 * \Delta t + \frac{1}{2} * \partial_2 * \Delta t^2.$$

Figure 17:
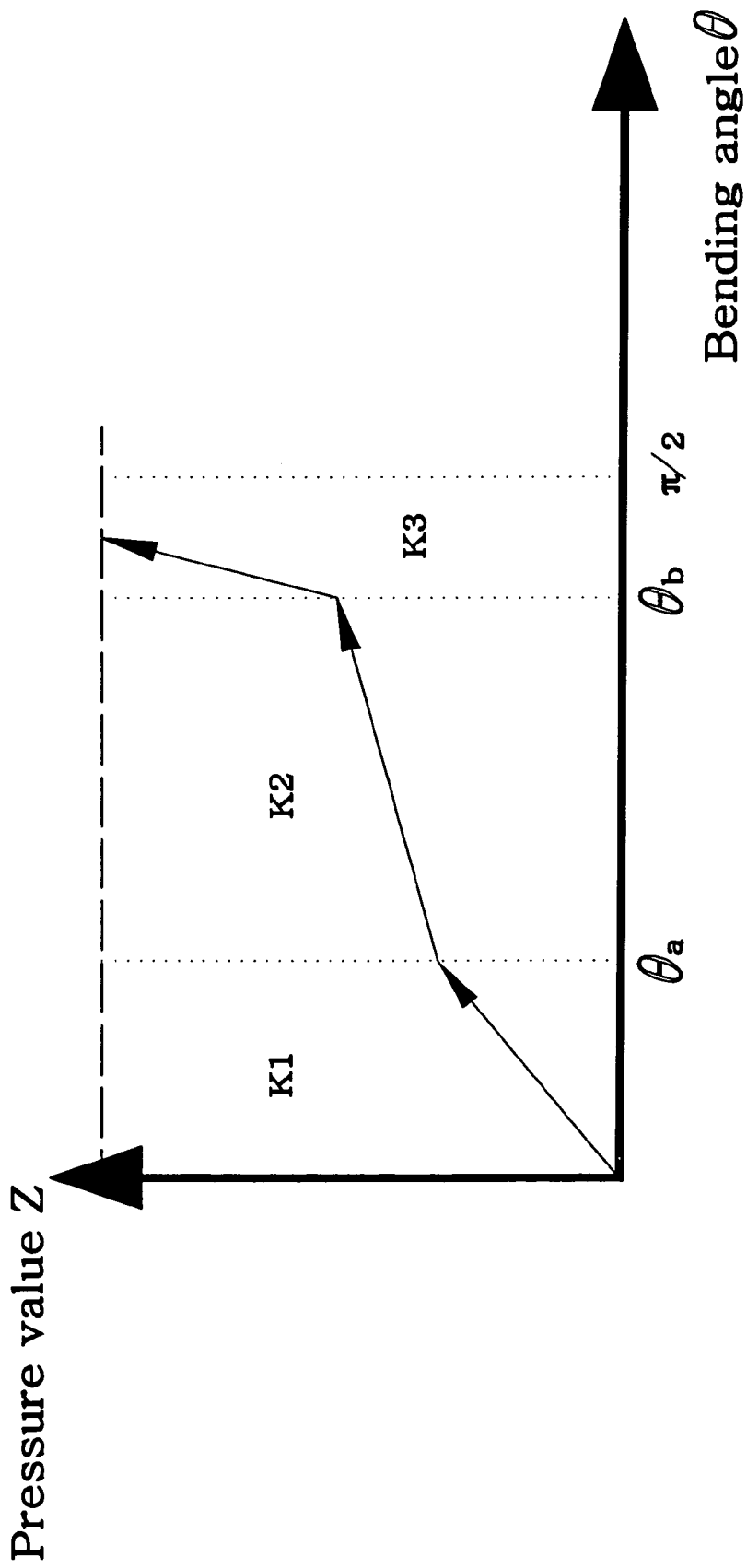
FIG. 17 shows a variation relationship between the bending angle of the pen head and the pressure value by the handwriting pen.

Please refer to FIG. 17. FIG. 17 is an angle-pressure variation graph showing the relationship between the bending angle θ of the pen head 180 and the pressure value Z exerting on the handwriting pen 100. The angle-pressure variation table is preset, and stored in the angle-pressure transformer 500. The angle-pressure transformer 500 employs the preset table to generate a pressure calculation formula, and substitutes the bending angle $\theta_2$ of the pen head 180 over time t+αt into the formula to compute the pressure value Z. The formula is as follows:

$$Z = \begin{cases} K_1 * \theta, & \text{if } 0 \le \theta \le \theta_a \\ K_2 * (\theta - \theta_n) + K_1 * \theta_a, & \text{if } \theta_a \le \theta \le \theta_b \\ K_3 * (\theta - \theta_b) + K_2 * (\theta_b - \theta_a) + K_1 * \theta_a, & \text{if } \theta \ge \theta_b \end{cases} ;$$

where $K_1$, $K_2$, and $K_3$ are preset slopes, and $\theta_a$ and $\theta_b$ are preset angles.

Figure 18:
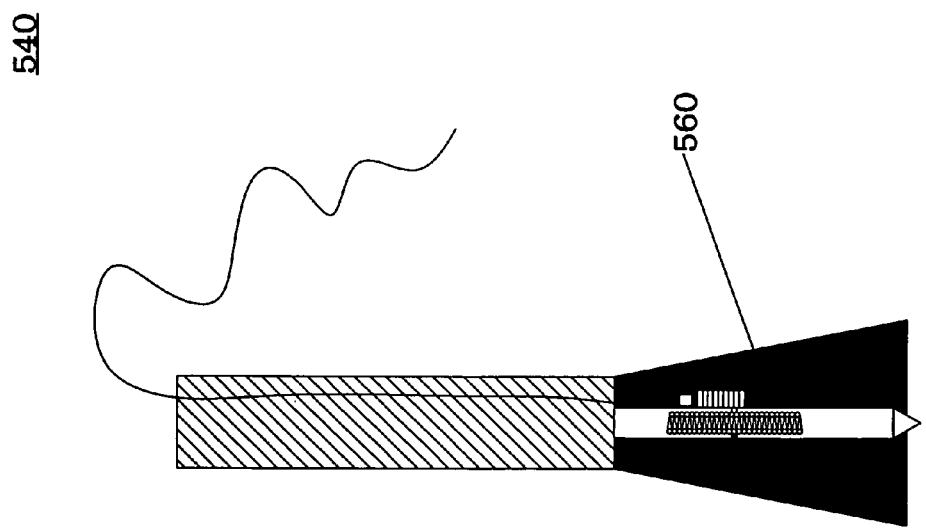
FIG. 18 is a schematic diagram of another example of the handwriting pen of the present invention.

Please refer to FIG. 18. FIG. 18 is a schematic diagram of another example of the handwriting pen 540 of the present invention. The shape of the pen head 560 of the handwriting pen 540 imitates the geometrical outline of the watercolor pen, for simulating the stroke of the watercolor pen.

As a result, the pen heads, 180 and 560, of the handwriting pens, 100 and 540, are made of soft materials, and their shapes imitate the geometrical outlines of the brush pen and watercolor pen; moreover, the handwriting pens, 100 and 540, will compute the pressing force by individuals according to deformation of the pen heads, 180 and 560, to simulate the strokes of the brush pen and the water color pen respectively.

While the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention.

What is claimed is:

1. A pen stroke simulation device installed in a main system, the main system connecting to a handwriting pen by a signal transmission line, the handwriting pen comprising:
    a pen tip;
    a pen tip position sensor for capturing a main position coordinates of the pen tip on a handwriting tablet that generates a main position data;
    a pressure sensor for sensing pressure by the pen tip on the handwriting tablet and generating a pressure value;
    wherein the handwriting pen transfers the main position data and the pressure value through the signal transmission line to the main system;
    the pen stroke simulation device comprising:
        a pressure-radius transformation module for receiving the pressure value and transforming the pressure value to a radius value;
        a positive vector generation module for receiving the main position data and generating a positive vector data according to the main position data;
        a density location generation module connecting to the pressure-radius transformation module and the positive vector generation module for generating a plurality of density location data in the direction of the positive vector at the main positions based on the radius and the positive vector data to express a plurality of coordinates of the density locations; and
        a pen stroke generation module for drawing a main line according to the pen tip sliding across the main positions over time and drawing a plurality of density lines according to the density location data where each main position data corresponding to a plurality of the density location data.

2. A pen stroke simulation device as claimed in claim 1, wherein the pressure-radius transformation module employs a pressure-radius transformation equation to transform the pressure value Z into a radius value $\bar{\omega}$, the pressure-radius transformation equation being represented as:

$$\begin{cases} \varpi = f(z) = (\text{Max}\varpi) * \left(\frac{e^z - 1}{e - 1}\right) \\ \text{where} \\ f(0) = 0 \\ f(1) = \text{Max}\varpi \\ 0 \le Z \le 1 \end{cases} ;$$

where Max $\bar{\omega}$ being the maximum preset value of radius.

3. A pen stroke simulation device as claimed in claim 2, wherein the positive vector generation module first acquires an instantaneous direction of the pen tip on the main position coordinate according to the main position data, the equation being expressed as:

$$V_i = \frac{O_i - O_{i-1}}{|O_i - O_{i-1}|};$$

where $V_i$ representing the instantaneous direction of the pen tip over time $t_i$, $O_i$ representing the main position coordinates of the pen tip over time $t_i$, and $O_{i-1}$ representing the main position coordinates of the pen tip over time $t_{i-1}$;
if $V_i=(x, y)$, the positive vector data $N_i=(-y, x)$.

4. A pen stroke simulation device as claimed in claim 3, wherein the density location generation module employs a density location generation equation to generate a plurality of density location data, the equation being represented as:

$$b_{i,j} = O_i + \varpi\left(\frac{j}{n} - 1\right) \cdot N_i$$

where $O_i$ representing the main position coordinates of the pen tip over the time $t_i$, $\bar{\omega}$ representing the radius data, $N_i$ representing the positive vector data, and n representing a system preset value used for forming number of the density location data, and $b_{ij}$ representing the $j^{th}$ density location coordinates of the $i^{th}$ main position coordinates;
    where the stroke drawn by the handwriting pen, comprising m main position data, and each main position data corresponding to n density location data.

5. A pen stroke simulation device as claimed in claim 4, wherein the stroke generation module employs the stroke forming method to form the main line and a plurality of density lines, assuming the main line is formed by m main position coordinates and each main position coordinates corresponds to n density location coordinates, the method including:

computing tangent vectors $T_i$ and $T_{i+1}$ of the $i^{th}$ and $(i+1)^{th}$ position coordinates, the equation being:

$$\begin{cases} T_{i+1} = a*(P_{i+1} - P_i) \\ a \in [0, 1] \end{cases};$$

where $P_{i+1}$, being the $(i+1)^{th}$ position coordinates, and $P_i$ being the $i^{th}$ position coordinates;

employing Blending functions to estimate the interpolating value between the $i^{th}$ and $(i+1)^{th}$ position coordinates, the Blending functions being shown as follows:

$$\begin{cases} h_1(s) = 2s^3 - 3s^2 + 1 \\ h_2(s) = -2s^3 + 3s^2 \\ h_3(s) = s^3 - 2s^2 + s \\ h_4(s) = s^3 - s^2 \\ 0 \le s \le 1 \end{cases};$$

acquiring a Cardinal Splines Curve, and the equation being:

$$\vec{P} = \vec{P}_i * h_1 + \vec{P}_{i+1} * h_2 + \vec{T}_i * h_3 + \vec{T}_{i+1} * h_4;\ \text{and}$$

computing the medium coordinate position between the $i^{th}$ and $(i+1)^{th}$ position coordinates, and linking the entire coordinate positions to form a smooth curve, the equation of the medium coordinate position being:

$$P = S*h*C;$$

where $$S = \begin{bmatrix} s^3 \\ s^2 \\ s^1 \\ 1 \end{bmatrix} \quad C = \begin{bmatrix} P_i \\ P_{i+1} \\ T_i \\ T_{i+1} \end{bmatrix} \quad h = \begin{bmatrix} 2 & -2 & 1 & 1 \\ -3 & 3 & -2 & -1 \\ 0 & 0 & 1 & 0 \\ 1 & 0 & 0 & 0 \end{bmatrix}.$$

6. A pen-stroke simulation device as claimed in claim 1, wherein the stroke generation module comprising:
a color parameters generation module, used to generate color parameters, relative to the main position data and the density location data through a random number generator.

7. A pen stroke simulation device as claimed in claim 6, wherein the color parameters generation module employs a color parameters generation equation to form the color parameters $\rho_i$, the equation being as follows:

$$\begin{cases} \rho_i = \rho_1 + \|rand()\| \% (\rho_2 - \rho_1 + 1) \\ \text{where} \\ \rho_1 \le \rho_i \le \rho_2 \\ \rho_1, \rho_2 \in [0, 255] \end{cases};$$

where $\rho_1$ and $\rho_2$ being system preset values.

8. A pen stroke simulation device as claimed in claim 7, wherein the stroke generation module comprising:
a speed parameters generation module for generating speed parameters relative to the main position data and the density location data; and
a speed-color parameters generation module for generating a speed-color parameters according to the color parameter and speed parameter.

9. A pen stroke simulation device as claimed in claim 8, wherein the speed parameters generation module employs a speed parameters generation equation to generate the speed parameter V, the equation being as follows:

$$V = f(v)\left(\frac{v_{max}^3 - 3v_{max}v^2 + 2v^3}{v_{max}^3}\right);$$

where $v$ representing the instantaneous speed of the handwriting pen at the main position coordinates, and $v_{max}$ representing a preset maximum speed; and the speed-color parameters generation module employing a speed-color parameters generation equation to generate the speed-color parameter $\rho_i$, the equation being as follows:

$$\rho_i = \rho_i * V.$$

10. A pen stroke simulation device as claimed in claim 1, wherein the stroke generation module comprising:
a shade parameters generation module for generating the shade parameters relative to the main position data and the density location data according to the pressure value.

11. A pen stroke simulation device as claimed in claim 10, wherein the main position data possesses the maximum value of the shade parameters, and the farther the distance from the main position coordinates, the smaller the shade parameter value of the density location data is.

12. A pen stroke simulation device as claimed in claim 11, wherein the shade parameters generation module employs a shade parameters generation equation to form shade parameter $\lambda$, the equation being as follows:

$$\lambda = (1 - \lambda_0)(1 - e^{-az}) + \lambda_0;$$

where a being a user defined constant, z being the pressure value, and $\lambda_0$ being a preset value of the shade parameters;

where the value of the pressure in the above equation exceeding a certain predefined value, the shade parameter approaching a constant.

13. A pen stroke simulation device as claimed in claim 1, wherein the stroke generation module comprising:
a dispersion parameters generation module generating a plurality of dispersion position data according to the main position data and the radius data $\overline{\omega}$ for representing a plurality of dispersion positional coordinates where each main position data corresponding to a plurality of dispersion position data.

14. A pen stroke simulation device as claimed in claim 13, wherein the dispersion parameters generation module consists of a dispersion parameters D, which is used to decide the distance between every two of the dispersion position coordinate q, and employs a dispersion position generation equation to generate dispersion positional coordinates, such that the farther the distance from the main position coordinates, the shorter the distance between the dispersion positional coordinates is, the equation being as follows:

$$\frac{\partial q}{\partial t} = D\nabla^2 q;$$

where the equation being expanded by employing the finite difference method:

$$\Rightarrow \frac{q_{i+1} - q_{i-1}}{2t} = D \cdot (q_{i+1} - 2q_i + q_{i-1})$$

$$\Rightarrow q_{i+1} = q_{i-1} + 2Dt \cdot q_{i+1} - 4Dtq_i + 2Dtq_{i-1}$$

$$\Rightarrow q_{i+1} = \left(\frac{1}{1-2Dt}\right)(-4Dtq_i + (1+2Dt)q_{i-1}).$$

15. A pen stroke simulation device as claimed in claim 13, wherein each dispersion position data corresponds to a dispersion color data, and the dispersion parameters generation module consists of a dispersion parameters D, to determine the variation in color between every two of the dispersion color data q, and to employ a dispersion color generation equation generating the dispersion color data, such that the farther the dispersion position from the main position, the smaller the difference between the dispersion color data is, the equation being as follows:

$$\frac{\partial q}{\partial t} = D\nabla^2 q;$$

where the equation being expanded by employing the finite difference method:

$$\Rightarrow \frac{q_{i+1} - q_{i-1}}{2t} = D \cdot (q_{i+1} - 2q_i + q_{i-1})$$

$$\Rightarrow q_{i+1} = q_{i-1} + 2Dt \cdot q_{i+1} - 4Dtq_i + 2Dtq_{i-1}$$

$$\Rightarrow q_{i+1} = \left(\frac{1}{1-2Dt}\right)(-4Dtq_i + (1+2Dt)q_{i-1}).$$

16. A pen stroke simulation device as claimed in claim 1, wherein the stroke generation module comprising:
a pause parameters generation module generating the pause parameters corresponding to the main position data and the density location data for determining whether the main position data and the density data will be seen.

17. A pen stroke simulation device as claimed in claim 16, wherein the pause parameters generation module consists of a table of preset values for the pause parameters, possessing a plurality of the pause parameters, for corresponding to the main position data and the density location data;
where the pause parameter being set to a first value, the corresponding position data being shown up, otherwise, a setting of a second value disabling the appearance of the corresponding position data;
the pause parameters d being represented as:

$$d = d\text{Table}(i);$$

where d $\in$ [0, 1].

18. A pen stroke simulation device as claimed in claim 1, wherein the stroke generation module comprising:
a color parameters generation module for generating color parameters, relative to the main position data and the density location data through a random number generator, where the color parameters generation module employing a color parameters generation equation to form the color parameters $\rho_i$, the equation being as follows:

$$\begin{cases} \rho_i = \rho_1 + \|rand()\|\%(\rho_2 - \rho_1 + 1) \\ \text{where} \\ \rho_1 \le \rho_i \le \rho_2 \\ \rho_1, \rho_2 \in [0, 255] \end{cases},$$

where $\rho_1$ and $\rho_2$ being system preset values;
a speed parameters generation module, for generating speed parameters, relative to the main position data and the density location data, where the speed parameters generation module employing a speed parameters generation equation to generate the speed parameter V, the equation being as follows:

$$V = f(v)\left(\frac{v_{\max}^3 - 3v_{\max}v^2 + 2v^3}{v_{\max}^3}\right),$$

where v representing the instantaneous speed of the handwriting pen at the main position coordinates, and $v_{max}$ representing a preset maximum speed;
a shade parameters generation module, for generating the shade parameters, relative to the main position data and the density location data, according to the pressure value, where the main position data possessing the maximum value of the shade parameters, and the farther the distance from the main position coordinates, the smaller the shade parameter value of the density location data being, the shade parameters generation module employing a shade parameters generation equation to form shade parameter $\lambda$, the equation being as follows:

$$\lambda = (1-\lambda_0)(1-e^{-az}) + \lambda_0,$$

where a being a user defined constant, z being the pressure value, and $\lambda_0$ being a preset value of the shade parameters, once the value of the pressure in the above equation exceeding a certain predefined value, the shade parameter approaching a constant;
a pause parameters generation module, for generating the pause parameters corresponding to the main position data and the density location data, to determine whether the main position data and the density data being seen, where the pause parameters generation module consisting of a table of preset values for the pause parameters, possessing a plurality of the pause parameters, which corresponding to the main position data and the density location data, once a pause parameter being set to a first value, the corresponding position data being shown up, otherwise, a setting of a second value disabling the appearance, the pause parameters d being represented as:

$$d = d\text{Table}(i),$$

where d $\in$ [0, 1]; and a stroke-color parameters generation module, used to generate the stroke-color parameters, according to color parameters $\rho_i$, rate parameters V, shade parameters $\lambda$, and pause parameters d, and the stroke-color parameters generation module employing a stroke-color parameters generation equation to compute the stroke-color parameters $C_{i,j}$, the equation being represented by:

$$C_{i,j} = *C_{i,j-1}*d*V;$$

where the stroke drawn by the handwriting pen, comprising m main position data, and each main position data corresponding to n density location data, and $C_{i,j}$ representing the stroke-color parameters to which the $j^{th}$ density location coordinates of the $i^{th}$ main position coordinates corresponding.

* * * * *